United States Patent
Yoshimura

(10) Patent No.: US 8,169,111 B2
(45) Date of Patent: May 1, 2012

(54) BRUSHLESS MOTOR

(75) Inventor: Hideo Yoshimura, Tochigi (JP)

(73) Assignee: Showa Corporation, Gyoda-Shi (JP)

( * ) Notice: Subject to any disclaimer, the term of this patent is extended or adjusted under 35 U.S.C. 154(b) by 274 days.

(21) Appl. No.: 11/955,641

(22) Filed: Dec. 13, 2007

(65) Prior Publication Data

US 2008/0297010 A1   Dec. 4, 2008

(30) Foreign Application Priority Data

May 30, 2007   (JP) .................................. 2007-143726

(51) Int. Cl.
*H02K 1/18* (2006.01)
*H02K 1/28* (2006.01)

(52) U.S. Cl. ................ 310/68 B; 310/83; 310/216.121; 310/216.123; 310/216.129; 310/216.132; 310/216.137

(58) Field of Classification Search ................ 310/68 B, 310/80, 83, 168, 216.121, 216.123, 216.129, 310/216.132, 216.137; 324/207.25

See application file for complete search history.

(56) References Cited

U.S. PATENT DOCUMENTS 5,162,685 A * 11/1992 Yamaguchi et al. ..... 310/156.28
2005/0040816 A1 * 2/2005 Ando et al. .............. 324/207.25

FOREIGN PATENT DOCUMENTS

JP   2003097973 A  *  4/2003
JP   2007-1364        1/2007

OTHER PUBLICATIONS

Machine translation of JP 2003097973 A, 2009.*
Patent Abstracts of Japan, Publication No. 2007-001364, Publication Date: Jan. 11, 2007, 2 pages.

* cited by examiner

*Primary Examiner* — Quyen Leung
*Assistant Examiner* — David Scheuermann
(74) *Attorney, Agent, or Firm* — Osha • Liang LLP

(57) ABSTRACT

A brushless motor has a stator, a rotor rotatably disposed in an inner circumferential portion of the stator, and a resolver configured to detect a rotational position of the rotor with respect to the stator. The resolver has a resolver stator disposed at a fixed circumferential position with respect to the stator, and a resolver rotor disposed at a fixed circumferential position with respect to the rotor.

16 Claims, 6 Drawing Sheets

BRUSHLESS MOTOR

BACKGROUND OF INVENTION

1. Field of the Invention

The present invention generally relates to a brushless motor preferably used in a motor-driven power steering apparatus or the like.

2. Background Art

A brushless motor for a motor-driven power steering apparatus has a rotor having a permanent magnet and a stator provided with a plurality of coils. The rotor is rotated by switching a current application to the coil. The brushless motor is applied to a motor portion of the motor-driven power steering apparatus of a vehicle. For example, in a rack type motor-driven power steering apparatus, a coaxial type brushless motor is used, a rack shaft is inserted into a rotating shaft of the rotor, and the stator is formed in a housing side fixed to a vehicle body side. Further, in the brushless motor, in order to determine a timing for switching the current application to the coil, a resolver is provided as a position detecting sensor detecting a rotational position of the rotor with respect to the stator.

In the conventional motor-driven power steering apparatus, the resolver has a resolver stator attached to a side of the housing portion, and a resolver rotor attached to a side of the rotor. One such apparatus is described in Japanese Patent Application Laid-Open No. 2007-1364. In an assembling step for this motor-driven power steering apparatus, a positioning (a phase alignment and a spark advance regulation) is executed in a relative rotating direction of the resolver stator and the resolver rotor, by relatively rotating the housing portion with respect to the motor portion, in a state in which the motor portion and the housing portion are temporarily fixed so as to be relatively rotatable. This makes it possible to correct a phase shift (a shift of an attaching position in a relative rotating direction) generated at a time of assembling the resolver stator and the resolver rotor.

In the brushless motor described in the patent document 1, due to an increase of an assembling step and a man hour for executing the phase alignment of the resolver stator and the resolver rotor, and a necessity of making assembling holes of the motor portion and the housing portion long in correspondence to the phase alignment thereof, it is necessary to fix after the phase alignment, and a deterioration on a layout is caused, thereby increasing a cost.

SUMMARY OF INVENTION

In one or more embodiments of the present invention, a brushless motor comprises a stator, a rotor rotatably disposed in an inner circumferential portion of the stator, and a resolver configured to detect a rotational position of the rotor with respect to the stator. The resolver comprises a resolver stator disposed at a fixed circumferential position with respect to the stator, and a resolver rotor disposed at a fixed circumferential position with respect to the rotor.

In one or more embodiments of the present invention, the resolver stator is disposed in the stator by engaging a first engagement portion provided at a specific position in a circumferential direction of the resolver stator with a second engagement portion provided at a specific position in a circumferential direction of an insulator of the stator, and the resolver rotor is disposed in the rotor by engaging a third engagement portion provided at a specific position in a circumferential direction of the resolver rotor with a fourth engagement portion provided at a specific position in a circumferential direction of a magnet of the rotor.

Other aspects and advantages of the invention will be apparent from the following description and the appended claims.

DETAILED DESCRIPTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
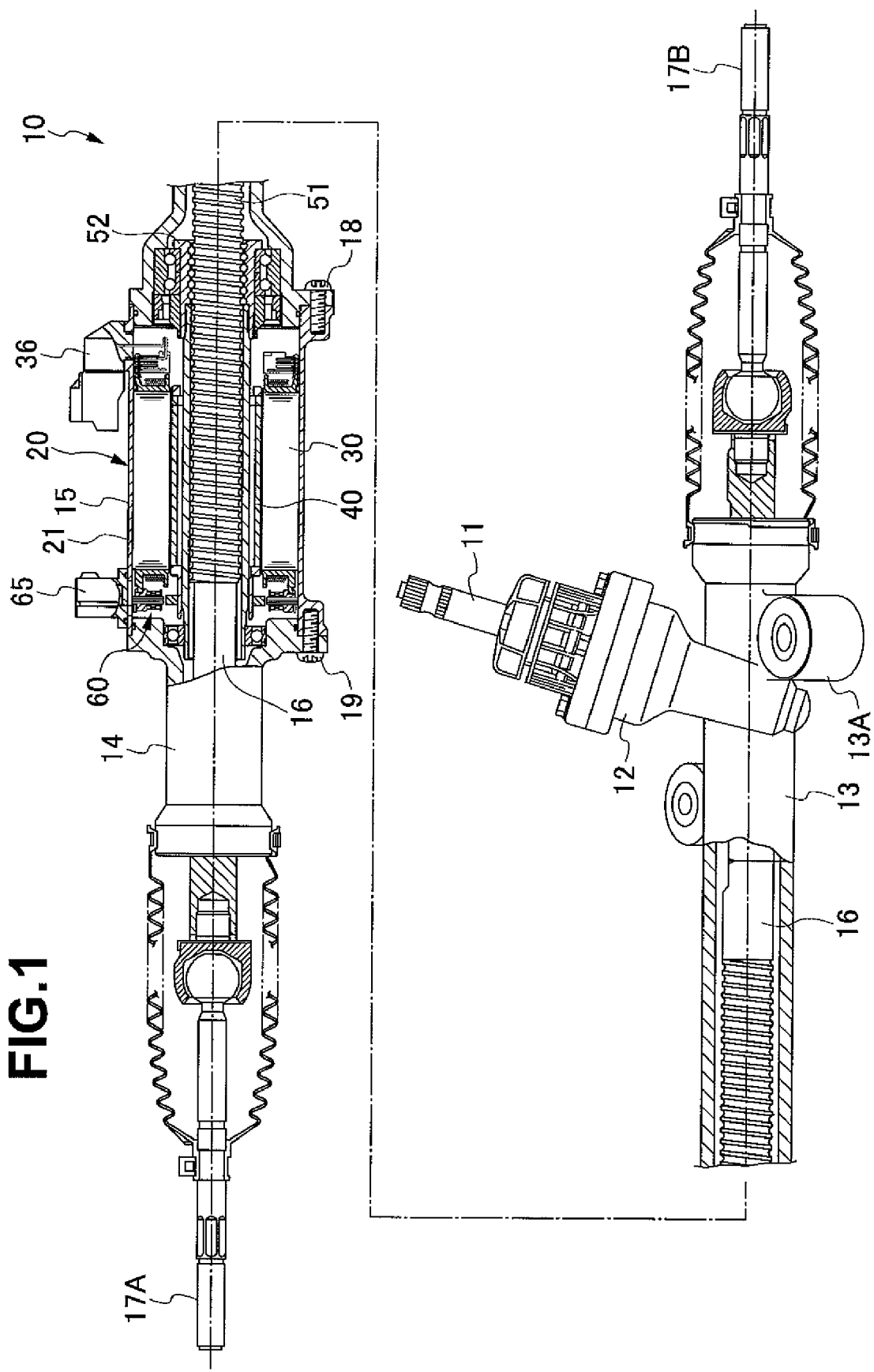
FIG. 1 shows a motor-driven power steering apparatus according to one or more embodiments of the present invention.
Figure 2:
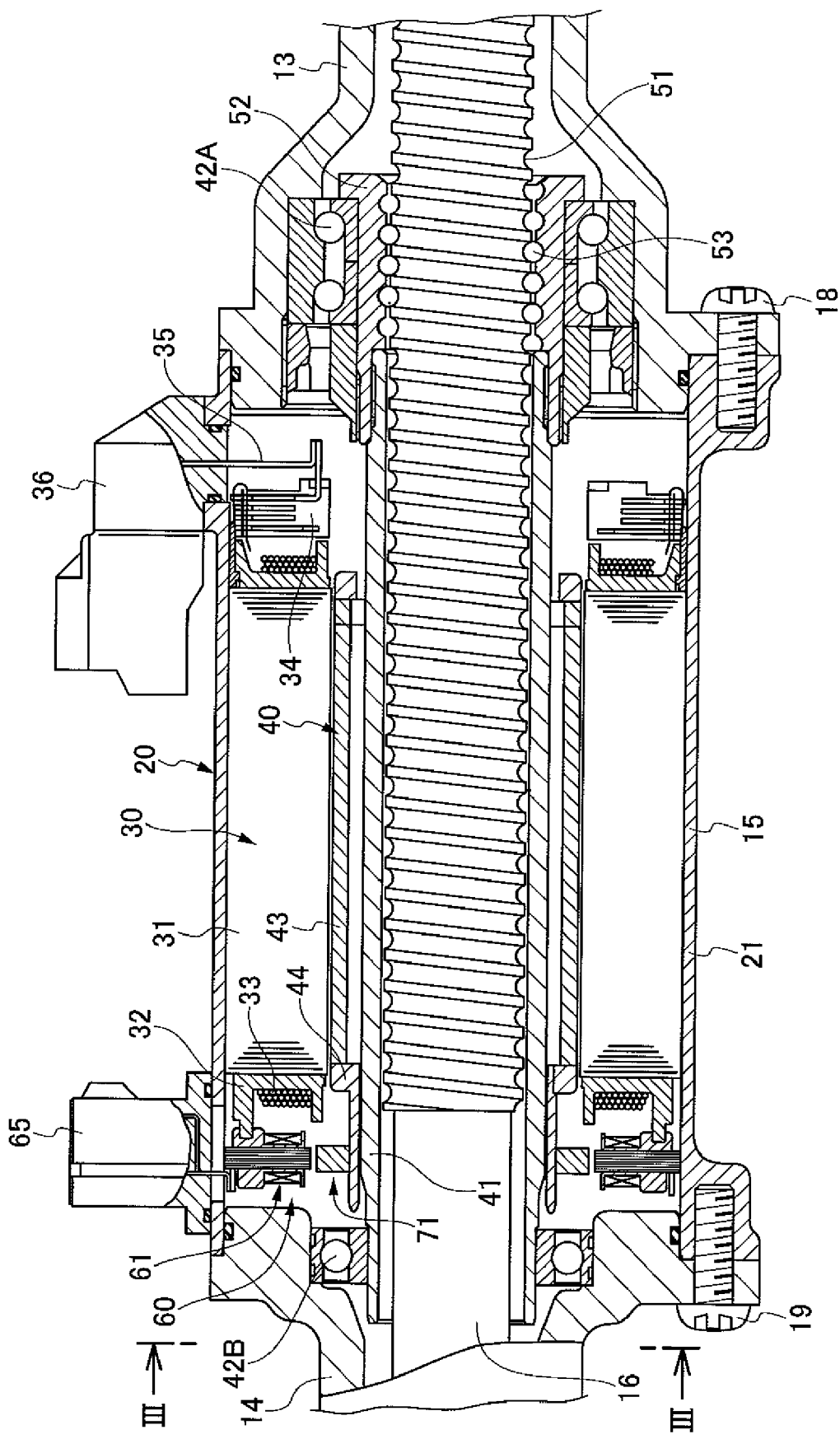
FIG. 2 is a cross-sectional view showing a brushless motor according to one or more embodiments of the present invention.
Figure 3:
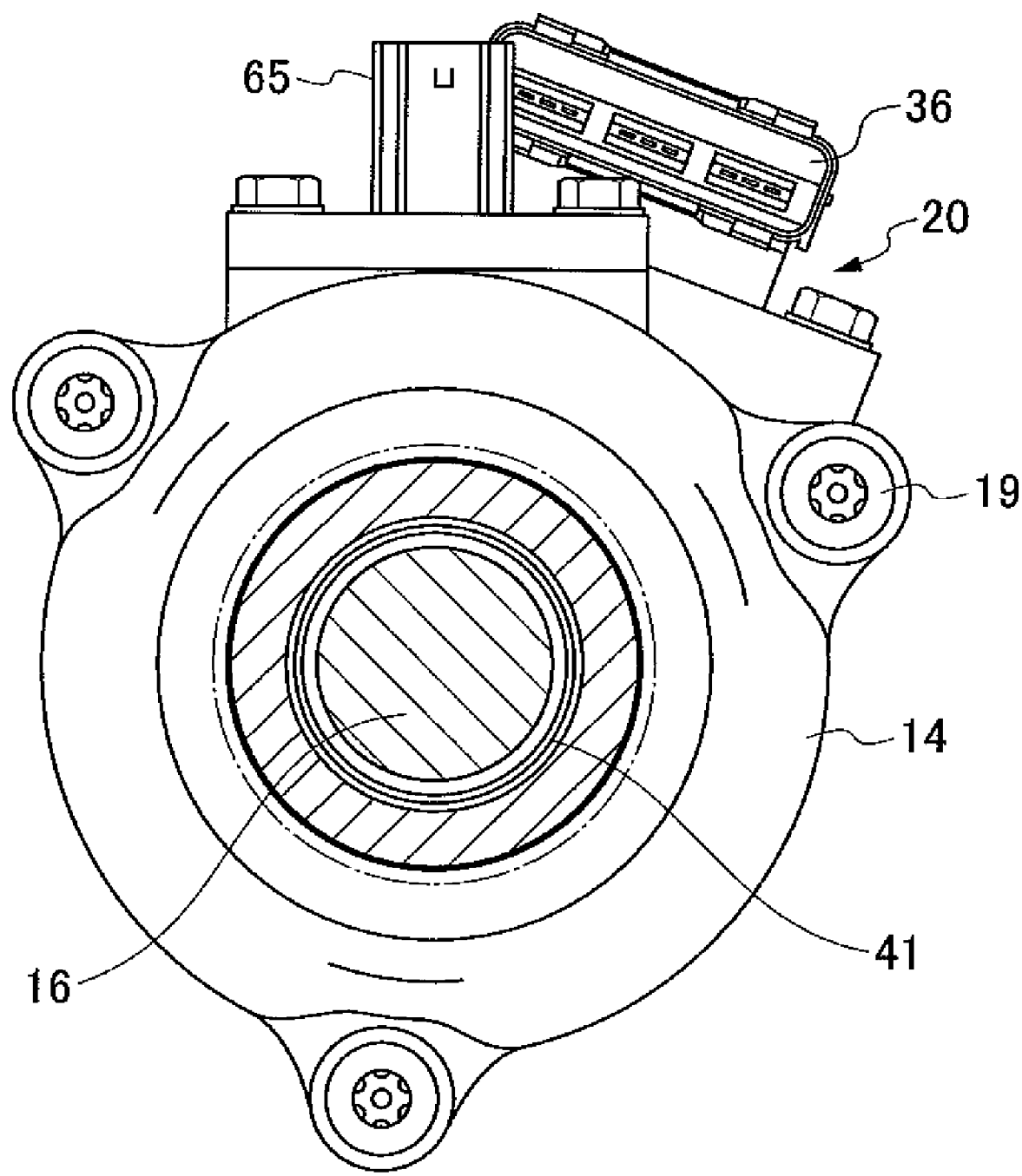
FIG. 3 is a cross-sectional view showing a brushless motor in the plane shown by III-III in FIG. 2.

A motor-driven power steering apparatus 10 has a gear box 12 supporting an input shaft 11 to which a steering wheel is coupled, and is structured such that the gear box 12 is attached to a first housing portion 13, as shown in FIGS. 1 to 3. The first housing portion 13 has an attaching portion 13A that attaches to a vehicle body, and a second housing portion 14 that is attached to the first housing portion 13 via a motor portion 15. Within the gear box 12, an output shaft (not shown) is coupled to the input shaft 11 via a torsion bar, and a steering torque detecting apparatus (not shown) is assembled between the input shaft 11 and the output shaft. A rack shaft 16 is inserted to the first housing portion 13, the second housing portion 14 and the motor portion 15 so as to be supported. A rack gear of the rack shaft 16 is engaged with a pinion gear of the output shaft within the gear box 12 so as to form a rack and pinion mechanism, and is linearly moved in an axial direction in correspondence to an operation of the steering wheel. In this case, tie rods 17A and 17B are coupled to both end portions of the rack shaft 16, and left and right wheels can be steered via the tie rods 17A and 17B on the basis of a linear movement of the rack shaft 16.

The motor-driven power steering apparatus 10 is structured such that a motor housing 21 constructing the motor portion 15 is attached to each of the first housing portion 13 and the second housing portion 14 by bolts 18 and 19, whereby a brushless motor 20 coaxially formed with the rack shaft 16 is structured. The brushless motor 20 has a stator 30, a rotor 40 rotatably arranged in an inner circumferential side of the stator 30, and a resolver 60 detecting a rotational position of the rotor 40 with respect to the stator 30.

The stator 30 has a laminated iron core 31 press-fitted to an inner circumference of the motor housing 21 so as to be fixedly arranged, and a coil 33 wound around the iron core 31 via a resin insulator 32. A coil winding forming the coil 33 is excited via a terminal 34 fixed to the motor housing 21, and a cable (a conductor) 35 feeding the terminal 34 is brought out to an outer side of the motor housing 21 via a plug 36.

The rotor 40 has a hollow rotating shaft 41 arranged around the rack shaft 16 over a whole length of the motor housing 21. A ball nut 52 is fixed to one end portion of the rotating shaft 41 and is press-fitted to a bearing 42 A of the first housing portion 13 so as to be pivoted. The other end portion of the rotating shaft 41 is press-fitted to a bearing 42 B of the second housing 14 so as to be pivoted. A rotor magnet 43 is positioned and fixed in a circumferential direction via a magnet holder 44 at a position facing to the stator 30 in an outer circumference of the rotating shaft 41.

The motor-driven power steering apparatus 10 is provided with a ball screw 51 in the rack shaft 16, and a ball nut 52 engaging with the ball screw 51 is fixed to one end portion of the rotating shaft 41. A steel ball 53 is held between a thread groove of the ball screw 51 and a thread groove of the ball nut 52, and a rotation of the ball nut 52 is converted into a linear motion of the rack shaft 16 by the ball screw 51.

Figure 4:
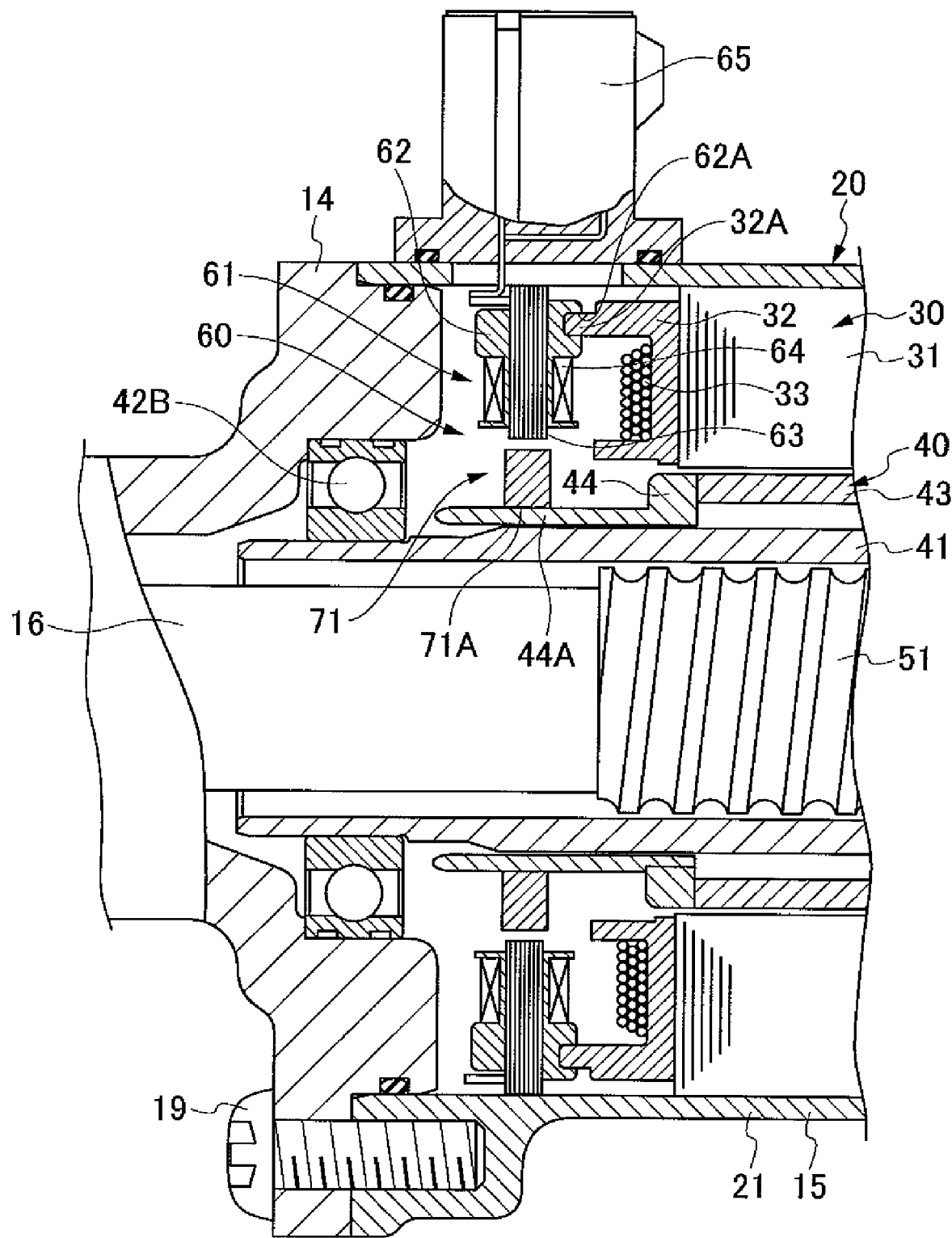
FIG. 4 is an enlarged cross-sectional view showing a resolver according to one or more embodiments of the present invention.

The resolver 60 has a resolver stator 61 assembled at a fixed circumferential position with respect to the stator 30, and a resolver rotor 71 assembled at a fixed circumferential position with respect to the rotor 40, as shown in FIG. 4. The resolver rotor 71 has an annular core in which a plurality of protruding poles are arranged in a circumferential direction. The resolver stator 61 has a coil 64 formed by winding a coil winding around the laminated iron core 63 held to a resin annular portion bracket 62. The coil winding forming the coil 64 is brought out to an outer side in the second housing portion 14 side from the plug 65. The resolver stator 61 is arranged in such a manner as to surround the resolver rotor 71 rotating together with the rotating shaft 41 of the rotor 40, and a rotational position of the rotating shaft 41 is detected on the basis of a change of a reluctance generated between the resolver stator 61 and the resolver rotor 71 due to the rotation. A predetermined current is fed to each of U-phase, V-phase and W-phase coils 33 of the stator 30 by a control circuit in an external portion in correspondence to the detected rotational position of the rotating shaft 41, and the motor 20 is controlled so as to be driven.

In one or more embodiments of the present invention, the resolver stator 61 is assembled at the fixed circumferential position with respect to the stator 30, and the resolver rotor 71 is assembled at the fixed circumferential position with respect to the rotor 40.

Figure 5:
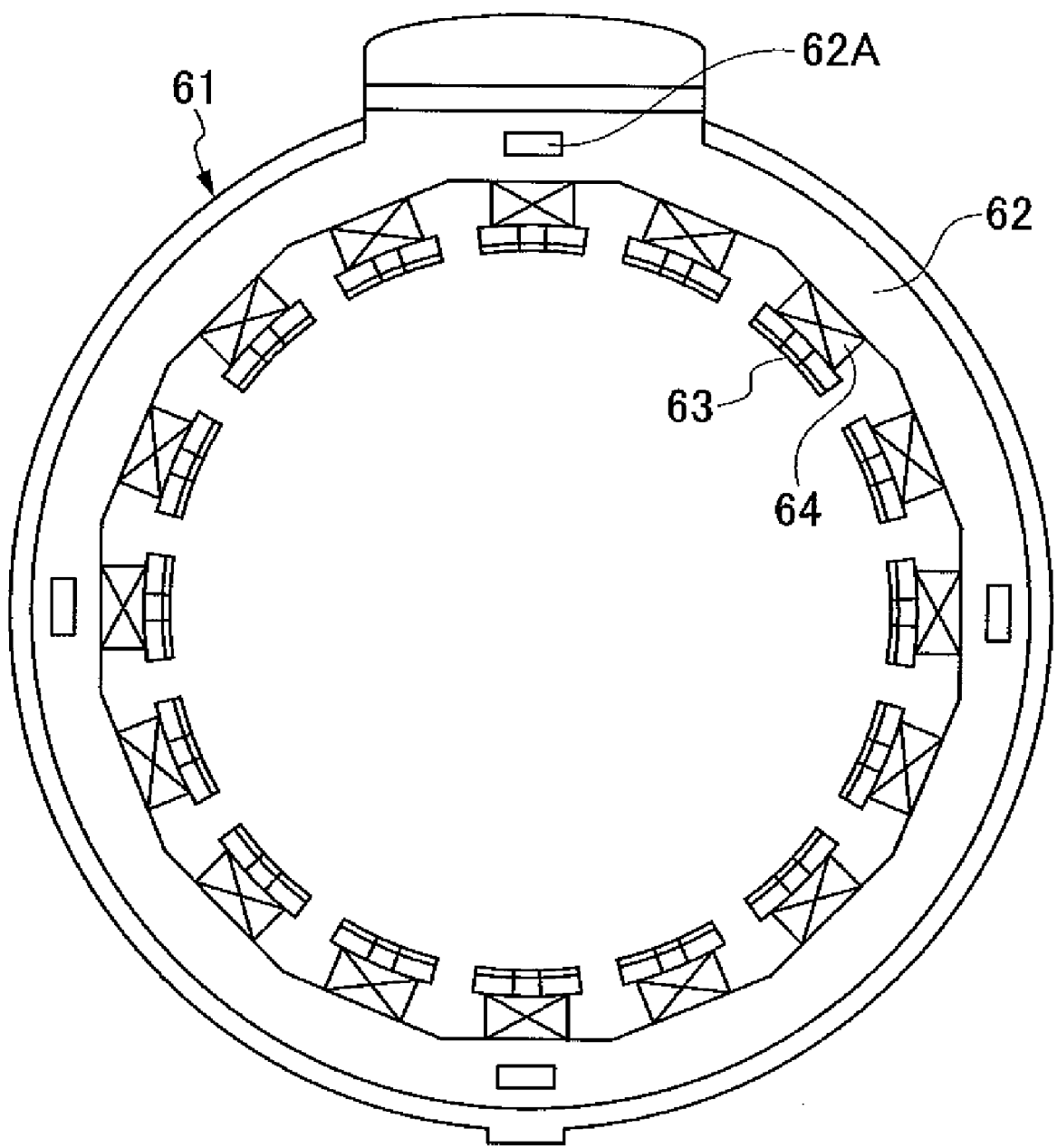
FIG. 5 is a front elevational view showing a resolver stator according to one or more embodiments of the present invention.
Figure 6:
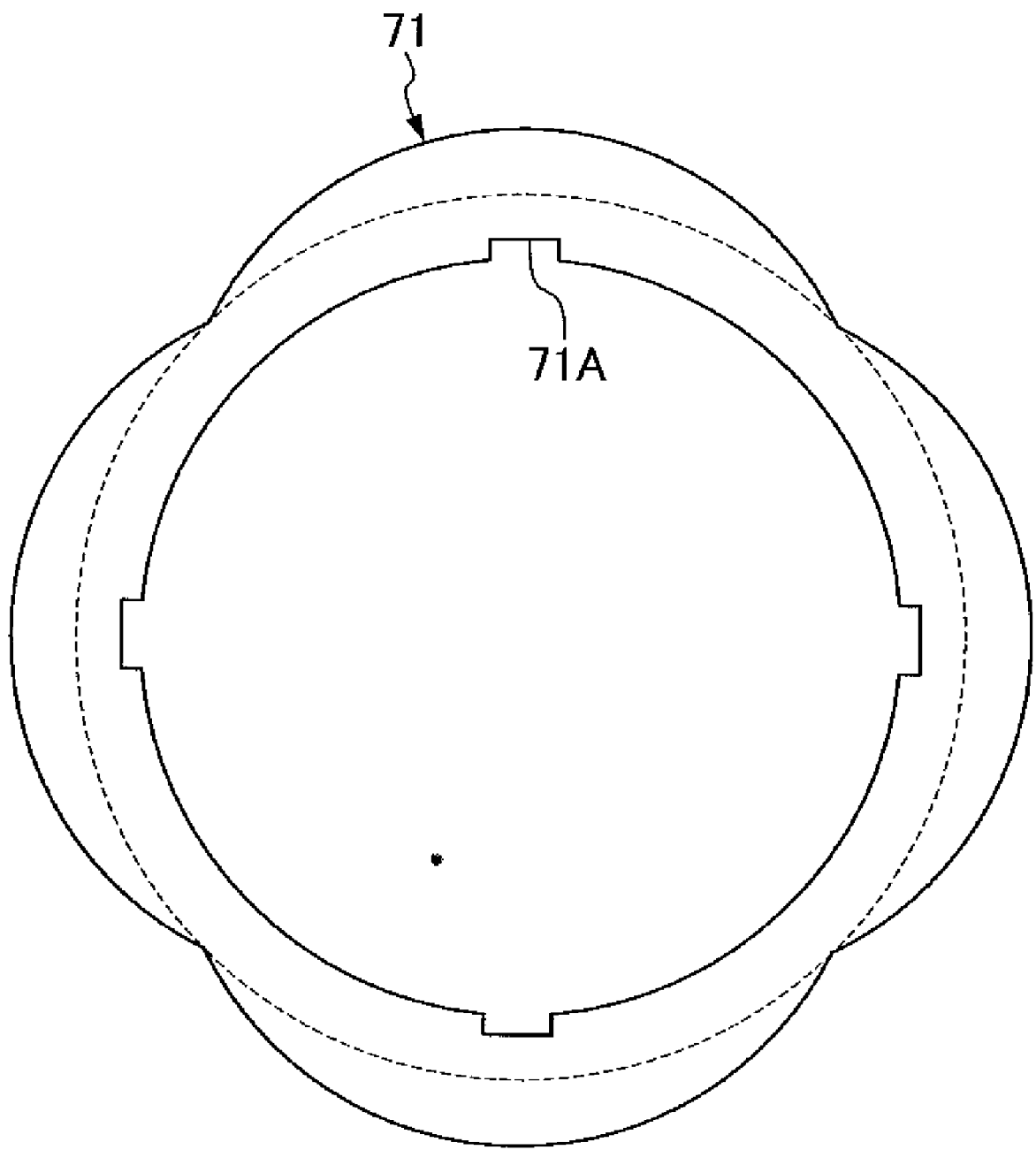
FIG. 6 is a front elevational view showing a resolver rotor according to one or more embodiments of the present invention.

Specifically, the resolver stator 61 is assembled in the stator 30, by engaging an engagement portion provided at specific position(s) in a circumferential direction of the resolver stator 61 with an engagement portion provided at specific position(s) in a circumferential direction of the insulator 32 of the stator 30. In the present embodiment, the resolver stator 61 is assembled in the stator 30, by engaging a concave engagement portion 62A (FIG. 5) provided at specific position(s) (for example, four positions) in the circumferential direction of a side surface of the bracket 62 of the resolver stator 61 with a projection engagement portion 32A provided at specific position(s) (for example, four positions) in the circumferential direction in an outer circumferential side of the insulator 32. Accordingly, in one or more embodiments of the present invention, a phase alignment of the stator 30 and the resolver stator 61 (a positioning in the circumferential direction of both the elements) is thereby performed, and a phase shift thereof (a shift of the assembled positions in the circumferential direction of both the elements with respect to the normal assembled position) becomes unnecessary.

Further, the resolver rotor 71 is assembled in the rotor 40, by engaging an engagement portion provided at specific position(s) in a circumferential direction of the resolver rotor 71 with an engagement portion provided at specific position(s) in a circumferential direction of the magnet 43 of the rotor 40. In the present embodiment, the resolver rotor 71 is assembled in the rotor 40, by engaging a groove (or a hole) 71A provided at specific position(s) (for example, four positions) in a circumferential direction of an inner circumference of the resolver rotor 71 with a projection engagement portion 44A protruded in an axial direction from specific position(s) (for example, four positions) in a circumferential direction of the magnet holder 44. Accordingly, in one or more embodiments of the present invention, a phase alignment of the rotor 40 and the resolver rotor 71 (a positioning in the circumferential direction of both the elements) is thereby performed, and a phase shift thereof (a shift of the assembled positions in the circumferential direction of both the elements with respect to the normal assembled position) becomes unnecessary.

A description will be given below of an operation of the motor-driven power steering apparatus 10.

(1) In the case that the steering torque detected by the steering torque detecting apparatus is lower than a predetermined value, a steering assist force is not necessary, and the electric motor 20 is not driven.

(2) In the case that the steering torque detected by the steering torque detecting apparatus is more than the predetermined value, the electric motor 20 is driven because the steering assist force is necessary. In the electric motor 20, the coil 33 of the stator 30 is excited in such a manner as to generate a necessary steering assist force, and the rotor 40 is driven so as to be rotated by a magnetic field generated in the stator 30. The generated torque of the motor 20 is transmitted to the ball nut 52 via the rotating shaft 41 from the rotor 40, and the rotation of the ball nut 52 is converted into the linear motion of the rack shaft 16 by the ball screw 51, and is applied as a steering assist force to the wheel working with the rack shaft 16.

In one or more embodiments of the present invention, the resolver 60 has the resolver stator 61 assembled at the fixed circumferential position with respect to the stator 30, and the resolver rotor 71 assembled at the fixed circumferential position with respect to the rotor 40. Accordingly, it is possible to do away with the phase shift between the stator 30 and the resolver stator 61/ and the phase shift between the rotor 40 and the resolver rotor 71. As a result, the phase alignment between the resolver stator 61 and the resolver rotor 71 is not necessary, and the resolver stator 61 correctly detects the rotational position of the rotor 40 with respect to the stator 30 on the basis of the change of the reluctance (generated between the resolver stator 61 and the resolver rotor 71). Accordingly, in one or more embodiments of the present invention, it is possible to negate the phase alignment step of the resolver stator 61 and the resolver rotor 71 after assembling the motor, and thus reduce the assembling step and the required man hour. Further, in one or more embodiments of the present invention, making the assembling hole for the fastening bolts 18 and 19 of the motor 15 and the housing portions 13 and 14 long for the phase alignment thereof and fixing after the phase alignment become unnecessary, and layout characteristics can be improved. Further, the cost can be reduced.

In one or more embodiments, the structure is made such that the resolver stator 61 is assembled in the stator 30 by engaging the engagement portion 62A provided at the specific position in the circumferential direction of the resolver stator 61 with the engagement portion 32A provided at the specific position in the circumferential direction of the insulator 32 of the stator 30, and the resolver rotor 71 is assembled in the rotor 40 by engaging the engagement portion 71A provided at the specific position in the circumferential direction of the resolver rotor 71 with the engagement portion 44A provided at the specific position in the circumferential direction of the magnet 43 of the rotor 40. Accordingly, in one or more embodiments of the present invention, it is possible to simply maintain the fixed assembled state having no phase shift between the stator 30 and the resolver stator 61, and the fixed assembled state having no phase shift between the rotor 40 and the resolver rotor 71. Further, in one or more embodiments of the present invention, it is possible to maintain a stable state in which the phase shift is not generated even by adding a shock or the like.

In one or more embodiments of the present invention, by the structures explained above, it is possible to simply achieve a low vibration and a low noise by the brushless motor 20 generating a smooth rotating characteristic and output characteristic.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A brushless motor comprising:
a stator comprising an insulator;
a rotor rotatably disposed in an inner circumferential portion of the stator; and
a resolver configured to detect a rotational position of the rotor with respect to the stator, wherein the resolver comprises:
a resolver stator disposed at a fixed circumferential position with respect to the stator, and
a resolver rotor disposed at a fixed circumferential position with respect to the rotor,
wherein the resolver stator comprises a first engagement portion comprising a plurality of concave engagement portions disposed at equal distances from a center of the resolver stator,
wherein the stator comprises a second engagement portion comprising a plurality of projection engagement portions disposed on the insulator at equal distances from a center of the insulator,
wherein the plurality of projection engagement portions are fitted into the plurality of concave engagement portions,
wherein a rotor magnet is positioned and fixed in a circumferential direction via a magnet holder at a position facing the stator in an outer circumference of a rotating shaft, and
wherein the resolver rotor is positioned and fixed in a circumferential direction with respect to the rotor via the magnet holder.

2. A brushless motor according to claim 1, wherein
the resolver rotor is disposed in the rotor by engaging a third engagement portion provided at a specific position in a circumferential direction of the resolver rotor with a fourth engagement portion provided at a specific position in a circumferential direction of the rotor magnet.

3. A brushless motor according to claim 1, wherein
the resolver stator has a coil formed by winding a coil winding around a laminated iron core held to a resin annular portion bracket,
the resolver rotor comprises an annular core in which a plurality of protruding poles are arranged in a circumferential direction, and
the resolver stator is arranged in such a manner as to surround the resolver rotor rotating together with the rotating shaft of the rotor.

4. A brushless motor according to claim 2, wherein
the resolver stator has a coil formed by winding a coil winding around a laminated iron core held to a resin annular portion bracket,
the resolver rotor comprises an annular core in which a plurality of protruding poles are arranged in a circumferential direction, and
the resolver stator is arranged in such a manner as to surround the resolver rotor rotating together with the rotating shaft of the rotor.

5. A brushless motor according to claim 2, wherein
the fourth engagement portion of the rotor comprises a projection engagement portion protruded in an axial direction from a specific position in the circumferential direction of the magnet holder, and
the engagement portion of the resolver rotor comprises a groove or a hole provided at a specific position in the circumferential direction of an inner periphery of the resolver rotor.

6. A brushless motor according to claim 3, wherein
the fourth engagement portion of the rotor comprises a projection engagement portion protruded in an axial direction from a specific position in the circumferential direction of the magnet holder, and
the third engagement portion of the resolver rotor comprises a groove or a hole provided at a specific position in the circumferential direction of an inner periphery of the resolver rotor.

7. A brushless motor according to claim 4, wherein
the fourth engagement portion of the rotor comprises a projection engagement portion protruded in an axial direction from a specific position in the circumferential direction of the magnet holder, and
the third engagement portion of the resolver rotor comprises a groove or a hole provided at a specific position in the circumferential direction of an inner periphery of the resolver rotor.

8. A motor-driven power steering apparatus comprising the brushless motor according to claim 1.

9. A motor-driven power steering apparatus comprising the brushless motor according to claim 2.

10. A motor-driven power steering apparatus comprising the brushless motor according to claim 3.

11. A motor-driven power steering apparatus comprising the brushless motor according to claim 4.

12. A motor-driven power steering apparatus comprising the brushless motor according to claim 5.

13. A motor-driven power steering apparatus comprising the brushless motor according to claim 6.

14. A motor-driven power steering apparatus comprising the brushless motor according to claim 7.

15. The brushless motor according to claim 1, wherein a coil is wrapped around the insulator at to an inner circumferential side of the projection engagement portions.

16. The brushless motor according to claim 15, wherein
the insulator has a bracket-shaped cross-section,
the coil is disposed within the bracket-shaped insulator, and
the projection engagement portion is on an outer circumferential side of the bracket-shaped insulator.

* * * * *